(12) United States Patent
Rupf (10) Patent No.: US 9,343,987 B2
(45) Date of Patent: May 17, 2016

(54) METHOD AND DEVICE FOR FREQUENCY GENERATION FOR A RESONANCE CONVERTER

(71) Applicant: SIEMENS AKTIENGESELLSCHAFT, Munich (DE)

(72) Inventor: Stephan Rupf, Claussnitz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/556,582

(22) Filed: Dec. 1, 2014

(65) Prior Publication Data

US 2015/0155790 A1 Jun. 4, 2015

(30) Foreign Application Priority Data

Nov. 29, 2013 (DE) .......................... 10 2013 224 586

(51) Int. Cl.
| | |
|---|---|
| *H02M 3/335* | (2006.01) |
| *H02M 1/42* | (2007.01) |
| *H02M 3/337* | (2006.01) |
| *H02J 7/02* | (2016.01) |
| *B60L 11/18* | (2006.01) |

(52) U.S. Cl.
CPC ......... *H02M 3/3376* (2013.01); *B60L 11/1816* (2013.01); *B60L 11/1824* (2013.01); *H02J 7/025* (2013.01); *B60L 2210/10* (2013.01); *B60L 2240/527* (2013.01); *B60L 2240/529* (2013.01)

(58) Field of Classification Search
CPC .................................................. H02M 3/33507
See application file for complete search history.

(56) References Cited

U.S. PATENT DOCUMENTS

| | | | |
|---|---|---|---|
| 2,783,384 A | 2/1957 | Bright | |
| 2008/0197802 A1 | 8/2008 | Onishi et al. | |
| 2012/0229034 A1* | 9/2012 | Yu ....................... | H02M 3/3376 315/186 |

FOREIGN PATENT DOCUMENTS

| | | |
|---|---|---|
| DE | 102008027126 A1 | 12/2009 |
| EP | 2713470 A1 | 4/2014 |
| JP | S63224677 A | 9/1988 |
| JP | H02250674 A | 10/1990 |
| JP | 2775822 B2 | 7/1998 |

* cited by examiner

*Primary Examiner* — Emily P Pham
(74) *Attorney, Agent, or Firm* — Laurence Greenberg; Werner Stemer; Ralph Locher (57) ABSTRACT

A method and an activation circuit for frequency generation for a resonance converter that is driven by a half bridge or a full bridge. An activation circuit with a controller excites a resonance circuit belonging to the resonance converter. The power, current or voltage of the resonance converter is controlled via the frequency. The controller activates a programmable variable clock generator via a first interface. The frequency dividers able to be programmed via a second interface create the operating frequency of the half bridge or full bridge by dividing the frequency of a clock generator into different duty cycles. The frequency of the clock generator amounts to a multiple of the bridge frequency, and the second clock generator and thereby the H-bridge frequency of the resonance converter is independent of the first clock generator which supplies the controller.

5 Claims, 6 Drawing Sheets

METHOD AND DEVICE FOR FREQUENCY GENERATION FOR A RESONANCE CONVERTER

CROSS-REFERENCE TO RELATED APPLICATION

This application claims the priority, under 35 U.S.C. §119, of German patent application DE 10 201 3 224 586.6, filed Nov. 29, 2013; the prior application is herewith incorporated by reference in its entirety.

BACKGROUND OF THE INVENTION

Field of the Invention

The present invention relates to a method for frequency generation for a resonance converter driven by a half bridge or a full bridge, in which an activation circuit with a controller excites a resonance circuit. The power of the resonance converter is controlled via the frequency.

The present invention further relates to an activation circuit with a controller for exciting a resonance circuit of a resonance converter driven by a half bridge or a full bridge.

A resonance converter is a direct current converter which operates with a resonance circuit and converts a DC voltage into a single-phase or polyphase AC voltage. If there is no rectification at the output of the resonance converter, said converter is also referred to as an inverter.

Simple inverter designs, which operate in each case with a pair of transistors as switching elements, are described, for example, in U.S. Pat. No. 2,783,384.

Wireless energy transmission, e.g. specifically for vehicle battery charging purposes, can be effected inductively by use of specific transformers, the primary and secondary side of which should be ideally disposed in terms of geometry. A specific, mostly complete coverage of the primary and secondary coil should be present so that scattering is minimized.

A charger for the purposes of charging a vehicle battery with inductive energy transmission is described, for example, in a commonly assigned patent application (not yet published, German patent application No. 12186787.3.)

A resonance converter driven by a half bridge or a full bridge, here referred to as an H bridge, forms a usual option for primary voltage generation, in which a resonance circuit excited by power electronics is used and the sine-wave voltage is coupled out in parallel to said circuit. Leakage inductance and useful inductance of the transformer are components of the resonance circuit, the resonance frequency is displaced when there is a change to the air gap geometry. The resonance frequency also changes slightly with the secondary load, the component tolerances as well as with temperature and ageing. The quality of the resonance circuit however changes severely in the case of the secondary load, i.e. a battery load with a dynamic internal resistance of a few mOhm represents a particular challenge.

The problem here is that the positioning can also vary during operation. A further problem is that foreign materials which can change the transmission behavior can be introduced into the air gap.

Figure 1:
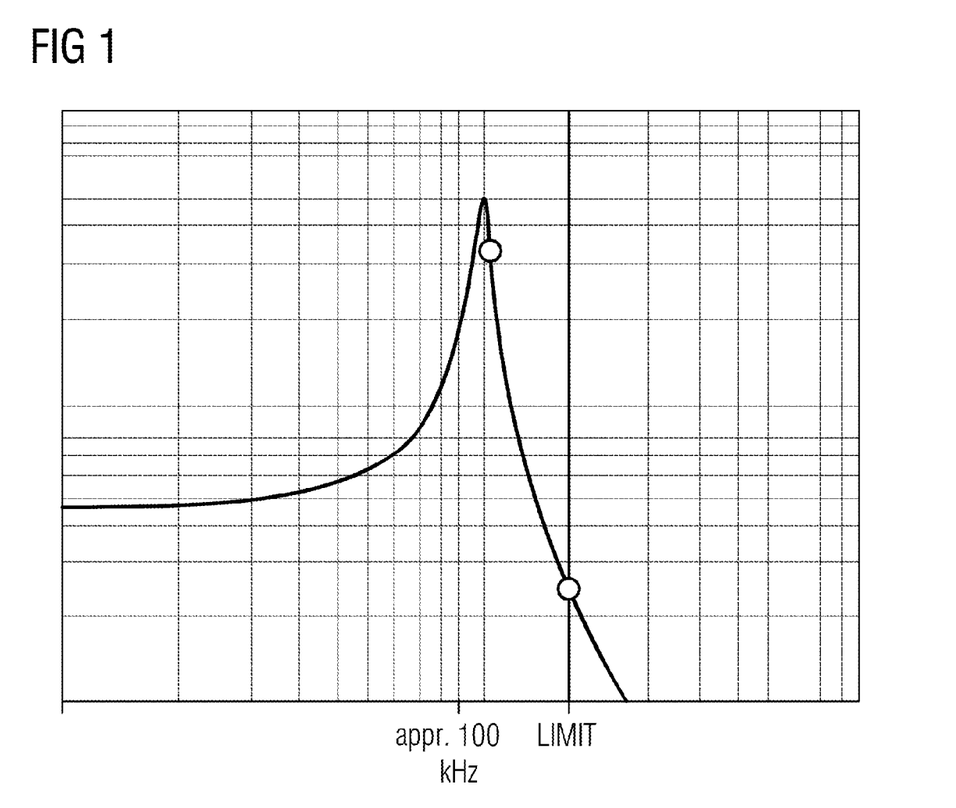
FIG. 1 shows a basic resonance curve of a resonance converter.

In the worst case the converter moves from over-resonance operation into under-resonance operation, which can lead to the destruction of the power semiconductors. In order to avoid this case the converter can be operated relatively far above the resonance frequency but the consequence of this however is that the power semiconductors will be operated beyond their capabilities and the level of efficiency will thus be made worse. In any event this requires the use of a controller with corresponding monitoring devices. The working range and the basic characteristic of the resonance curve are shown in FIG. 1. Since the geometrical parameters and thus the inductance, capacitance and also attenuation resistance of the resonance circuit are largely stationary apart from the deviations explained above, the power can only be regulated for a feed voltage only able to be varied within certain limits—DC link voltage, via the frequency. The marked range thus identifies the working range which is again restricted with the limit frequency "LIMIT". FIG. 1 shows an idealized situation, but clearly shows that already very small frequency changes lead to large changes of the phase between current and voltage and thus transmission power. For a sufficient regulation accuracy relative frequency changes must therefore be able to be carried out far below the per-mil range with exact adherence to the dead time for the activation of the H-bridge transistors.

The problem to be solved technically thus consists of creating a frequency that is sufficiently stable and to be varied in very fine steps with the necessary dead time generation for the H-bridge (resonance converter)—by contrast the phase monitoring does not represent any great challenge. The said dead time must also be able to be varied depending on the working point to guarantee an optimum level of efficiency and paucity of harmonics.

In order to clarify the frequency ranges involved it should be mentioned that the H-bridge frequency usually lies in the range around 100 kHz. The clock frequency of the controller usually lies in the 100 MHz range. A simple use of the processor-internal clock divider of the PWM units for the H-bridge frequency generation is thus excluded since the attainable frequency variation steps are too coarse (in this case 100 Hz). It is also not helpful to increase the processor frequency by a factor of 10 for example. The frequency step width in that case is still significantly too coarse. What are demanded are variation capabilities of less than 1 Hz, partly in the millihertz range, i.e. in very fine steps in order, especially with secondary battery load with a dynamic load resistance close to 0 Ohm, to make a stable operation possible.

SUMMARY OF THE INVENTION

It is accordingly an object of the invention to provide a method and a device for frequency generation for a resonance converter which overcomes the above-mentioned and other disadvantages of the heretofore-known devices and methods of this general type and which provides for frequency variations in very fine steps. It is a further object to provide for an activation circuit for a resonance converter of the type stated above which makes possible a variation of the frequency with the necessary variable dead time generation.

With the foregoing and other objects in view there is provided, in accordance with the invention, a method for frequency generation for a resonance converter driven by a half bridge or a full bridge, the method comprising:

providing an activation circuit with a controller and exciting a resonance circuit with the activation circuit, wherein a power, a current or a voltage of the resonance converter is controlled via the frequency;

operating the controller via a first clock generator and, via a first interface, controlling with the controller a frequency of a second clock generator that is operated independently of or asynchronously of the first clock generator;

generating with two frequency dividers a working frequency of the half bridge or full bridge by dividing a frequency of the second clock generator; and via a second interface, controlling with the controller a divider ratio of the frequency dividers with which a dead time is generated;

wherein a frequency of the second clock generator amounts to a multiple of the bridge frequency.

In other words, the objects of the invention are achieved by a method that may be summarized as follows:

a) via a first interface the controller supplied via a first clock generator controls the frequency of a second clock generator, which is independent of the first clock generator, which is operated independently or asynchronously from the first clock generator, b) two frequency dividers create the working frequency of the half bridge or full bridge from said frequency, by dividing the frequency of the second clock generator, c) via a second interface the controller controls the variation of the pulse duty factor of these two frequency dividers, with which a dead time is generated, and d) the frequency of the second clock generator amounts to a multiple of the bridge frequency.

The objects relating to the activation circuit are achieved with a circuit having the following features:

a) a first clock generator which is used for clock supply of the controller;

b) a second clock generator able to be programmed via a first interface, the frequency of which amounts to a multiple of the bridge frequency;

c) two frequency dividers on the one hand for creating the operating frequency of the half bridge or full bridge by dividing the frequency of the second clock generator and on the other hand for dead time generation; wherein d) a divider ratio used for this is able to be controlled by the controller via a second interface.

The frequency of the second clock generator amounts to a multiple of the necessary bridge frequency, so that the activation pulse of the H-bridge including necessary dead times can be created from the frequency with sufficient accuracy.

Other features which are considered as characteristic for the invention are set forth in the appended claims.

Although the invention is illustrated and described herein as embodied in a frequency generation for a resonance converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawing in detail there is shown an exemplary embodiment of the invention, in some cases greatly simplified. Parts or parameters corresponding to one another are labeled with the same reference characters in all figures.

Figure 2:
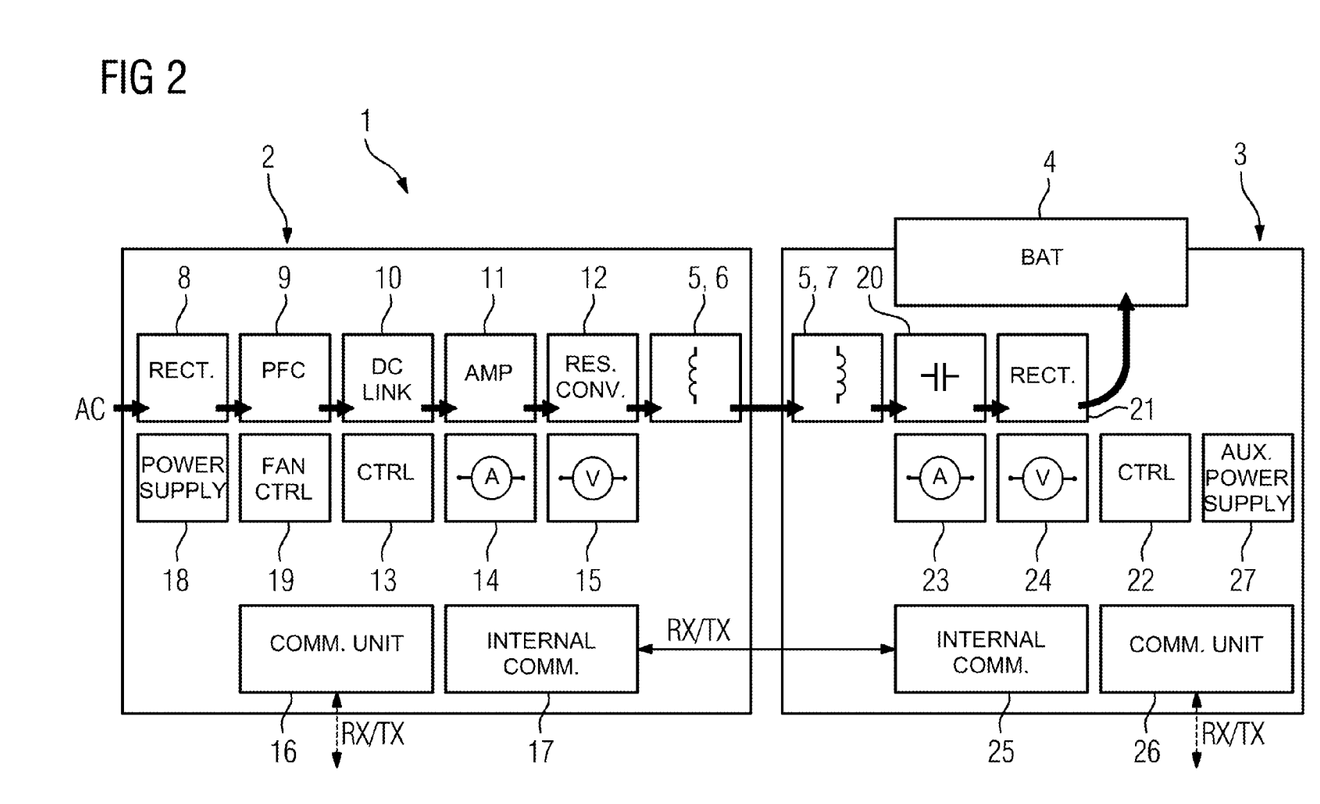
FIG. 2 shows a block diagram of a battery charging system for wireless charging of the battery with a resonance converter.

Referring now to FIG. 2, a battery charging system labeled as a whole with the reference character 1, is composed of a primary side 2, which is in a fixed location and a secondary side 3, which is located on board an electric vehicle with a battery 4 to be charged.

The interface between the primary side 2 and the secondary side 3 is formed by a transformer 5 with a primary-side winding 6 (primary coil) and a secondary-side winding 7.

The primary side 2 of the battery charging system 1 further comprises a rectifier 8, a power factor correction filter 9 (PFC), a DC link circuit 10 and also an amplifier 11, which supplies electrical power to a resonance converter 12 which operates with a resonant circuit of which the resonance frequency depends inter alia on the inductance of the primary-side winding 6 of the transformer 5.

The resonance converter 12 is activated with the aid of a controller 13, which is likewise located on the primary side 2 of the battery charging system 1. In addition a primary-side current sensor 14 and also a primary-side voltage sensor 15 are present. A communication unit 16 is provided for exchange of data, with a higher-ranking controller for example. An additional, internal communication element 17 is able to be used for calibration, regulation and maintenance purposes. Further components of the primary side 2 are a power supply 18 and a fan controller 19.

Located on the secondary side 3, connected downstream from the secondary-side winding 7, are a capacitor 20 and also a rectifier 21. Like the primary side 2, the secondary side 3 also has a controller 22, a current sensor 23 and also a voltage sensor 24. In a similar way to the internal primary-side communication element 17, an internal communication element 25 is provided on the secondary side 3, especially for calibration, control and maintenance purposes. Instead of a communication unit 16, a vehicle communication element 26 built into the vehicle is present on the secondary side 3. Instead of a power supply 18 delivering one or more DC voltages, such as is provided on the primary side 2, the secondary side 3 merely has one auxiliary power supply 27.

Figure 3:
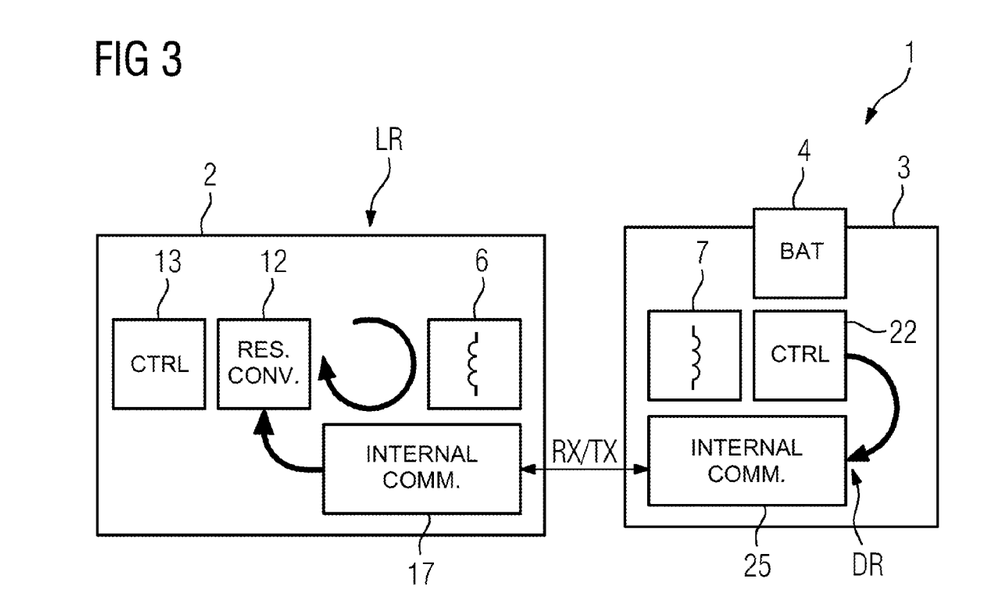
FIG. 3 shows a simplified diagram of the battery charging system depicted in FIG. 2 with regulation circuit illustrated.

The fundamentals of the control of the battery charging system 1 are illustrated in FIG. 3, which shows a simplified diagram of the arrangements according to FIG. 2. The figure shows a primary-side power control circuit LR. Data feedback DR from the secondary side 3 to the primary side 2 relates to calibration data which is detected cyclically on the secondary side 3 for power calibration of the battery charging system 1 (entirely in varying time intervals). Thus current or voltage of the secondary side can be regulated via this interface, but because of the data transmission link these have a significantly inferior performance.

Figure 4:
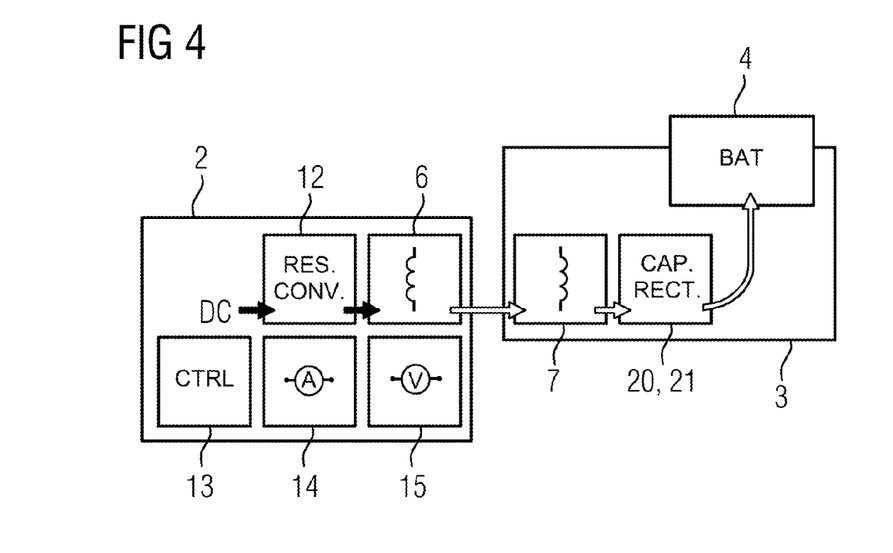
FIG. 4 shows a further simplified diagram of the battery charging system depicted in FIG. 2, in which the sensor systems and actuator systems relevant for the regulation circuit are shown in greater detail.

FIG. 4 shows the battery charging system 1 compared to FIG. 2 and FIG. 3, especially as far as the secondary side 3 is concerned, again in a simplified diagram, wherein the capacitor 20 and the secondary-side rectifier 21 are visualized in this case as one single component. The primary-side sensor system for voltage and current intensity detection is shown in greater detail here.

It is thus desirable to create the frequency precisely variable in the finest steps, to also set the dead time variably for this purpose and thus create a perfect adjustment element for the regulation loop. The extreme steepness of the resonance curve in accordance with FIG. 1 means that this is the key point in the regulation chain—the actual value detection in the form of the phase analysis (in conjunction with current and voltage measurement) on the other hand can be less accurate by orders of magnitude.

Figure 5:
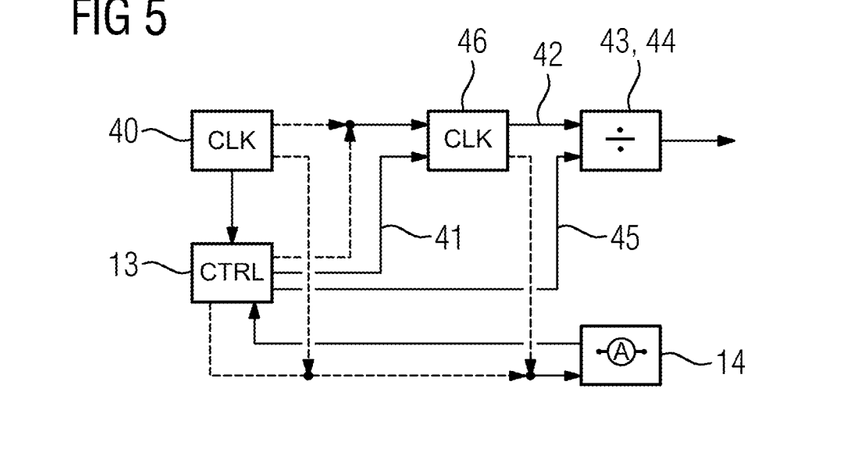
FIG. 5 shows an inventive activation circuit with a controller for controlling frequency dividers for the excitation of a resonant circuit of a resonance converter driven by a half bridge or a full bridge.

FIG. 5 shows an inventive activation circuit with a controller for exciting a resonance circuit of a resonance converter driven by a half bridge or a full bridge. The controller 13, of which the clock supply is guaranteed by a usually mostly quartz-stabilized first clock generator 40, controls the frequency 42 of a second clock generator 46 via a first interface 41. The synchronous frequency dividers 43, 44 located in a separate module (mostly CPLD/FPGA) which create the activation impulses with the operating frequency of the H-bridge are programmed via a second interface 45. These dividers 43, 44 programmable via the second interface 45 thus also generate via a variable pulse duty factor the necessary dead time and safeguard said time. Their clock supply is thus insured by the variable second clock generator 46, thus runs independently and asynchronously to the controller 13. The frequency 42 of the second clock generator 46 amounts to a multiple, e.g. 64 times, the necessary H-bridge frequency.

The second clock generator 46 can be realized using a VCO 47 (Voltage Controlled Oscillator) or via DDS 48 (Direct Digital Synthesis). The advantage of the two variants is a frequency variation accuracy down to far below per-mil range.

Figure 6:
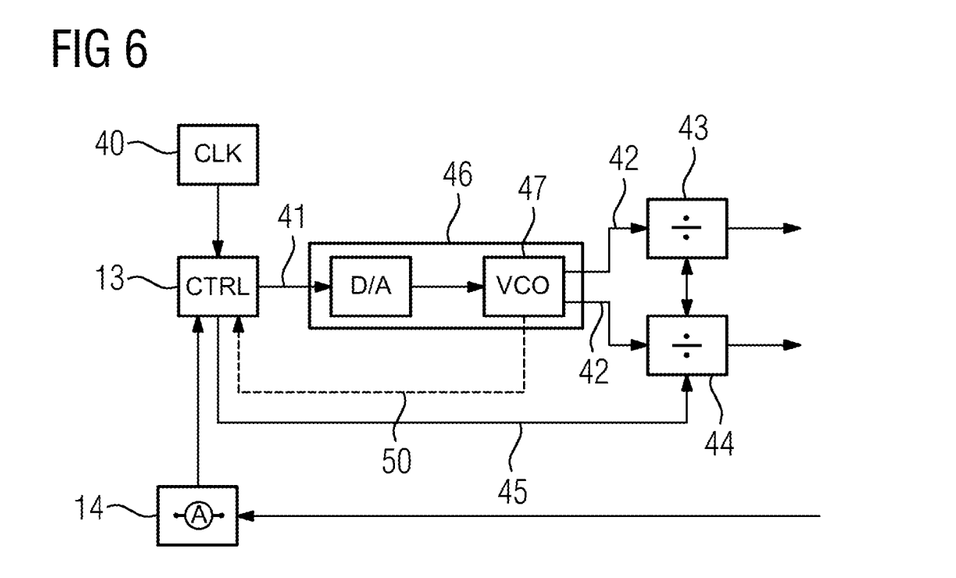
FIG. 6 shows an inventive activation circuit with a VCO as clock generator.

In the case of the VCO 47 in accordance with FIG. 6, this range is defined by the frequency noise of the generator or noise of the necessary control voltage of the VCO 47. Checking the frequency is possible via feedback to the controller 13, identified by the connection 50. This is also to be seen in FIG. 7.

In the case of frequency creation via DDS 48 (FIG. 7), the precision is even greater and easily fulfils the requirements. Through the digital principle applied there feedback is dispensed with. The DDS 48 here creates a triangular frequency which is converted by the comparator 49 into the rectangular signal necessary for the programmable dividers 43, 44.

Figure 7:
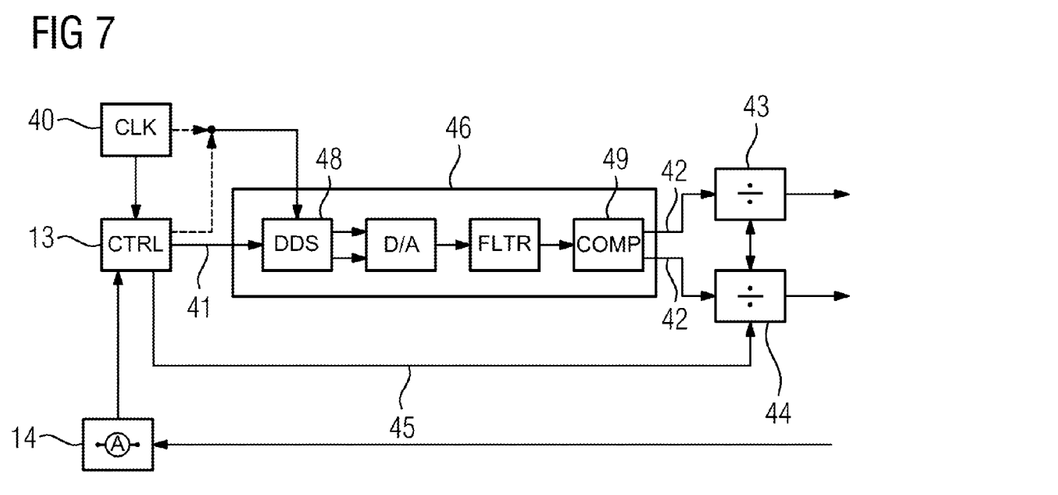
FIG. 7 shows an inventive activation circuit with a DDS in an alternatively triggered clock generator.

Since in both cases there is an asynchronicity between controller 13 and VCO 47/DDS 48, the interfaces 41 and 45 should be designed as parallel interfaces, which means greater wiring outlay but has the advantage of being able to accept extremely rapid changes in value. Depending on the task involved however, an appropriately clocked serial interface can be used.

The frequency 42 created from the second clock generator 46 is therefore a multiple of the H-bridge frequency, because the dead times have to be created from said frequency with sufficient accuracy. To this end the same frequency divisions, but with complementary or inverse pulse duty factors, are programmed. The dead time is thus able to be programmed in steps which depend on the frequency ratio 42 at the outputs 43 and 44. The results, i.e. the H-bridge activation signals latched via the dead times, are thus bound to the frequency of the second clock generator in an absolutely fixed way and do not carry any synchronization effects to the first clock generator 40 of the controller 13. The phase or current and voltage analysis necessary for the regulation circuit is implemented in the usual way. The accuracy in this case does not present a challenge because of the narrowband nature of the resonance curve.

Figure 8:
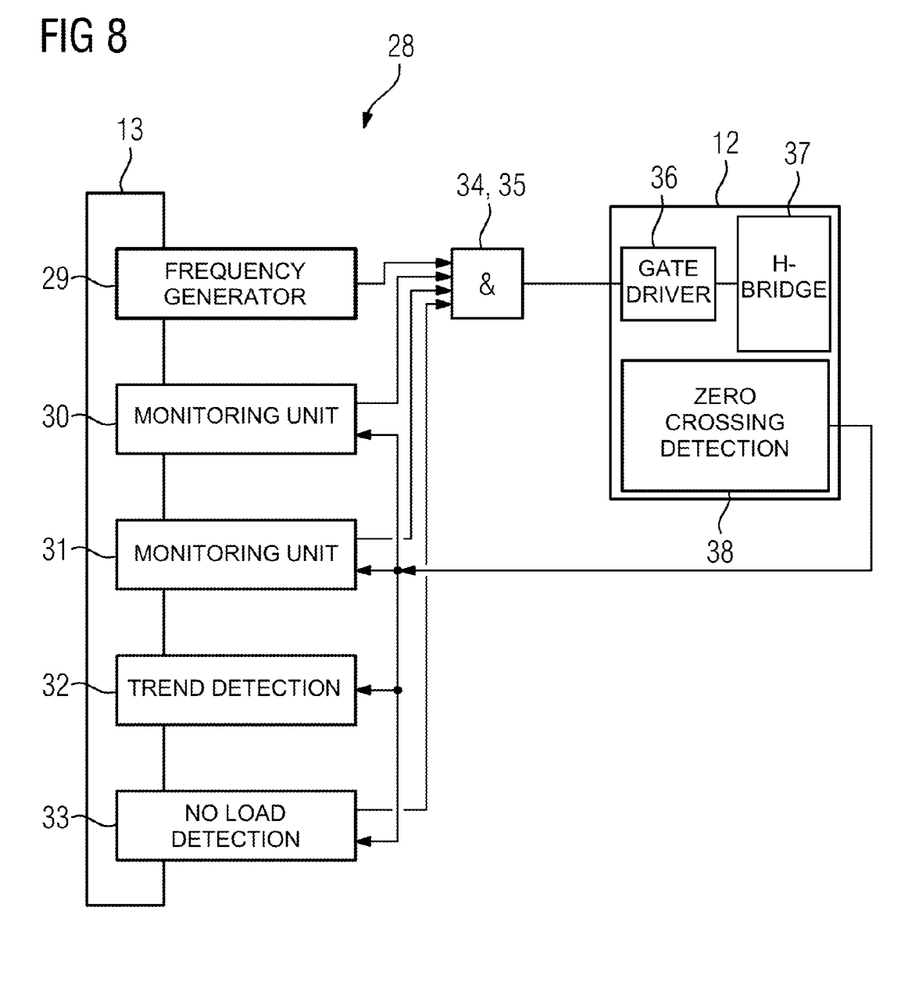
FIG. 8 shows a circuit arrangement with more detailed presentation of individual modules for the operation of the resonance converter, namely the frequency generator, the short-circuit monitoring unit, the resonance error monitoring unit, phase analysis and also the no-load detection circuit.

FIG. 8 shows all components necessary for the safe operation of the resonance converter, namely a circuit arrangement 28 which comprises the primary-side controller 13 and the resonance controller 12. The controller, together with five modules 29, 30, 31, 32, 33, which will be described in greater detail below, as well as a logic circuit 34, forms an activation matrix 35 for activating the resonance converter 12. The resonance converter 12 comprises a plurality of power electronics components, namely gate drivers 36, H-bridge 37 and current converter as well as zero crossing detection circuits for current and voltage 38.

The individual modules 29, 30, 31, 32, 33, which interact with the controller 13, are a frequency generator 29, a short-circuit monitoring unit 30, a resonance error monitoring unit 31, a resonance trend detection unit 32 and a no-load detection circuit 33.

For greater understanding and for the sake of completeness all modules are described, but the modules 29, and to an extent 31, are primarily relevant for this invention.

Dual Phase Frequency Generation 29:

Central point of the invention, this module is indispensable for operation and features the innovations described. It consists of a digital or analog frequency-controllable generator controlled from the controller, which for its part delivers the parent clock for the actual H-bridge frequency and dead time creation. The frequency is to be able to be controlled or regulated in sufficiently fine intervals, also in order to avoid the danger of the resonance converter becoming underresonant relatively rapidly if the frequency changes.

Short-Circuit Protection 30:

This module has no special features, it serves solely to monitor the current through the semiconductor (short-circuit protection). The controller here is solely responsible for the setting of the limit, the protection function itself is controller-independent.

This method has the advantage that it switches very quickly and needs hardly any additional components or only additional components able to be implemented easily or already present and also insensitive, the current converter 38 is used multiple times for current measurement of the controller (for the purposes of phase and power regulation), the module 30, module 31, module 32 and module 33.

Resonance Error Monitoring Unit 31:

Here the converter is switched off shortly before reaching the critical state. This method likewise has the advantage that it is controller-independent and for any given oscillation train switches very quickly separately and needs hardly any additional components or only additional components that are easy to implement or present and are additionally insensitive.

Module 31 goes into action if module 32 does not engage quickly enough or the controller 13 is defective. The first situation is the case if an object disturbing the magnetic circuit engages suddenly and at high-speed, or primary and/or secondary severe load or location changes occur.

Phase Analysis 32:

The phase analysis and also current and voltage analysis necessary for the regulation circuit is triggered in the usual way. The clock for this digitally-operating module can be supplied via the first clock generator 40 or the second clock generator 46.

No-Load Detection Circuit 33:

The no-load detection circuit is relatively independent of the controller functionality, i.e. once parameterized by the controller, the no-load point is monitored independently thereof in real time and if necessary a delay-free converter shutdown is performed.

The invention claimed is:

1. A method for frequency generation for a resonance converter driven by a half bridge or a full bridge, the method comprising:
   providing an activation circuit with a controller and exciting a resonance circuit with the activation circuit, wherein a power, a current or a voltage of the resonance converter is controlled via the frequency;
   operating the controller via a first clock generator and, via a first interface, controlling with the controller a frequency of a second clock generator that is operated independently of or asynchronously of the first clock generator;
   generating with two frequency dividers a working frequency of the half bridge or full bridge by dividing a frequency of the second clock generator; and
   via a second interface, controlling with the controller a divider ratio of the frequency dividers with which a dead time is generated;
   wherein a frequency of the second clock generator amounts to a multiple of the bridge frequency.

2. The method according to claim 1, which comprises checking the frequency generated by the second clock generator via a feedback to the controller.

3. The method according to claim 1, which comprises feeding the frequency of the second clock generator back to the controller for checking.

4. An activation circuit with a controller for exciting a resonance circuit of a resonance converter driven by a half bridge or a full bridge, the activation circuit comprising:
   a) a first clock generator for supplying a clock signal to the controller;
   b) a second clock generator configured to be programmed via a first interface, a frequency of said second clock generator amounting to a multiple of a bridge frequency;
   c) two frequency dividers for generating an operating frequency of the half bridge or full bridge by dividing the frequency of said second clock generator and for dead time generation;
   d) wherein a divider ratio is controlled by said controller via a second interface.

5. The activation circuit according to claim 4, wherein said first interface is a parallel interface.

* * * * *